United States Patent

Domanski et al.

[11] Patent Number: 5,427,676
[45] Date of Patent: Jun. 27, 1995

[54] METHOD OF MAKING A CAST-TO-SIZE MOLD FOR MOLDING FINISHED PLASTIC PARTS

[75] Inventors: Edward M. Domanski; Edward F. Ryntz, Jr., both of Warren; Dexter D. Snyder, Birmingham, all of Mich.

[73] Assignee: General Motors Corporation, Detroit, Mich.

[21] Appl. No.: 103,949

[22] Filed: Aug. 10, 1993

[51] Int. Cl.$^6$ .............................................. C23C 28/00
[52] U.S. Cl. .................................. 205/122; 156/245; 205/178; 205/181; 205/183; 205/917
[58] Field of Search ................ 205/70, 122, 150, 183, 205/917, 178, 181; 156/245; 249/116

[56] References Cited

U.S. PATENT DOCUMENTS

| | | | |
|---|---|---|---|
| 2,765,248 | 10/1956 | Beech et al. | 154/110 |
| 3,406,105 | 10/1968 | Letendre | 205/115 |
| 3,533,921 | 10/1970 | Kalvonjian | 205/183 |
| 3,775,176 | 11/1973 | Cross et al. | 205/166 X |
| 4,732,962 | 3/1988 | Atkins et al. | 528/94 |
| 4,920,161 | 4/1990 | Wang et al. | 523/220 |

OTHER PUBLICATIONS

"Platable Filler and Sealant", Marshall Space Flight Center, Alabama; NASA Tech Briefs, Jan. 1992.

*Primary Examiner*—John Niebling
*Assistant Examiner*—William T. Leader
*Attorney, Agent, or Firm*—Lawrence B. Plant

[57] ABSTRACT

Method of making a cast-to-size mold for molding class A finishes on molded plastic articles including the steps of filling any pores in the molding surface with a conductive thermosetting resin and thereafter electroplating the surface.

15 Claims, No Drawings

METHOD OF MAKING A CAST-TO-SIZE MOLD FOR MOLDING FINISHED PLASTIC PARTS

This invention relates to a method of making cast-to-size molds for molding plastic parts with as-molded class A finishes.

BACKGROUND OF THE INVENTION

For many decorative applications, it is desirable for plastic parts to have a so-called "class A" surface finish which is a very smooth, lustrous, decorative surface. Post-molding buffing and polishing of the parts can be eliminated if the articles could be molded in such a manner as to provide the class A surface on the article as it leaves the mold. One way to achieve this is to provide a smooth, polished mold surface against which the article is molded.

It is known to produce substantially cast-to-size molds having molding cavities therein conforming substantially to the finished dimensions of the article to be molded. Such molds can be made by simply casting the mold material against a pattern conforming substantially to the finished dimensions of the article to be molded, and thereafter removing the pattern so as to leave a mold cavity available to receive plastic injected thereinto. Typically, such molds will be made in at least two halves with an appropriate parting line therebetween for removal of the pattern as well as the molded plastic article. This cast-to-size approach to mold-making eliminates much of the expense that otherwise occurs from machining the mold parts out of blocks of metal.

It is well known to use certain zinc alloys containing copper and aluminum for casting such cast-to-size molds. A common such alloy contains about 10% to about 11% copper, about 3% to about 4% aluminum, about 0.35% to about 0.55% magnesium, up to 0.06 iron and the balance zinc. This material shrinks somewhat on cooling, and as a result, develops some microporosity throughout the structure. When the molding surface is finished, the finishing process removes some of the surface material and continually exposes some of the sub-surface pores which are often as large as 0.002 inches in diameter. This porosity prevents such molds from forming "class A" finishes on the as-molded parts since. In this regard, under normal operating temperatures and pressures encountered in injection molding, the plastic is forced into the surface pores and creates a roughened surface on the molded article.

It is also old and known to prepare cast-to-size molds by starting with a pattern (e.g., plaster) conforming substantially to the finished dimensions of the plastic part to be molded, coating it with a release agent, thermal spraying (e.g., wire arc) about 0.03 inches to about 0.04 inches of metal (typically zinc) onto the pattern to form a metal shell thereover, casting highly-filled tool epoxy resin about the metal shell to back up and reinforce the shell, and thereafter curing the epoxy resin. Examples of such tool epoxies are described in Arkins et al U.S. Pat. No. 4,732,962 and Wang et al U.S. Pat. No. 4,920,161 which are assigned to the assignee of the present invention. Such molds, however, have been unacceptable for producing as-molded, articles having class A surfaces because the sprayed metal shell is quite porous, and accordingly presents substantially the same problems as discussed above in connection with the aforesaid zinc alloy molds.

Finally, it has heretofore been proposed to electroplate the molding surfaces of the aforesaid cast-to-size molds to provide the surface finish needed to mold class A finishes. Single and multiple layers of electroplated metal have both been proposed. In one such proposal, for example, a single layer of nickel is used atop the zinc. In another proposal, a layer of silver is first electrodeposited directly onto the zinc to block the diffusion of a subsequently deposited copper into the zinc. A layer of copper is subsequently electrodeposited atop the silver, and finally a hard layer of nickel and/or chromium is electrodeposited atop the copper. Unfortunately, electroplating alone can fill only the shallowest of the surface pores, and a pocked surface can result if the pores are not completely filled. Moreover, even strong "leveling" electrodeposits, such as copper, tend to cover over the larger pores rather than completely fill them because the metal deposits rapidly at the pore opening and either inhibits deposition deeper within the pore or forms a cap covering over and closing off the pore. This cap seals off the pore and often traps the plating solution therein which, in turn, can subsequently either (1) corrode the deposit, (2) upon heating, vaporize and erupt through the coating, or (3) expand enough upon heating to raise/lift the coating causing blisters to occur on the molding surface. Finally, if electrolyte is not trapped within the pore, the cap is susceptible to deformation or rupture inwardly of the pore incident to applied pressure of the molten plastic being injected into the mold cavity. Some of these problems might be eliminated if the electroplating were performed very slowly over a prolonged period of time, but such an approach is not commercially practiced. A quicker and more reliable method for preparing the mold's surface for class-A molding is desired.

It is an object of the present invention to provide a process for manufacturing a substantially cast-to-size mold for directly molding class A surfaces onto molded plastic articles including so filling the otherwise porous molding surface of a cast-to-size mold so as to permit the electrodeposition of a smooth metal coating thereon for molding class A surfaces thereagainst and directly onto the as-molded article. This and other objects and advantages of the present invention will become more readily apparent from the description thereof which follows.

BRIEF DESCRIPTION OF THE INVENTION

The present invention contemplates a method of making a cast-to-size mold capable of forming a class A surface on an as-molded plastic article including the steps of: (1) providing a pattern which conforms substantially to the finished dimensions of the plastic article to be molded; (2) casting a mold-forming material about the pattern so as to form a molding surface within the mold defining a molding cavity for shaping the article to be molded; (3) filling (e.g., as by brushing or trowling) any pores in the molding surface with an electrically conductive (i.e., metal-filled) thermosetting resin; (4) curing the resin; and (5) electrodepositing at least one, and preferably several, layers of metal atop the surface to provide a smooth surface for molding thereagainst. A preferred such resin for this purpose comprises a high temperature epoxy (i.e., one having a 175° C. continuous use capability, and 300° C.–400° C. transient use capability) filled with silver powder. Silver loadings of about 95% by weight are most preferred, but lower loadings are acceptable so long as sufficient silver is present in the resin to conduct enough current to effect electrodeposition thereon. Excess resin is removed from the surface as by scrapping, or the like. The resin is cured by heating, or the like. The conductive epoxy fills the pores and provides sufficient conductivity thereacross to support the electrodeposition of the metal thereon. The molding surface is electroplated with a suitable metal(s) so as to provide a level, smooth, continuous metallic topcoat atop the molding surface which topcoat is impervious to the plastic being molded thereagainst and resistant to rupturing and/or blistering in use. The electrodeposits may be applied by immersing the mold in a suitable electrolyte opposite a suitable anode or by using the well-known "brush-plating" or "swab-plating" technique wherein the electrolyte flows through the end of a suitable applicator (e.g., brush) onto a localized area of the mold and electrolyzed thereat to deposit the metal. The applicator then traverses the entire surface to be plated.

In accordance with a preferred embodiment of the invention, the porous metal forming the molding surface comprises porous zinc, or alloys thereof, and at least one metal is electrodeposited thereon. Most preferably, several different metals are electrodeposited onto the surface to provide a level, smooth, hard surface. In the most preferred embodiment, the resin-filled zinc surface is coated with a layer of silver, a layer of copper and finally a layer of nickel and/or chromium.

In accordance with one embodiment of the invention, a mold is cast about a pattern and comprises a low melting (i.e., below ca 600° C.), low shrink, strong, hard, zinc alloy containing about 10–11% by weight copper, and 3–4% aluminum and about 0.35–0.55% by weight magnesium. In accordance with another embodiment of the invention, a pattern is coated first with a sacrificial release layer, and then a thermally sprayed (i.e., wire arc) zinc-layer. The thusly coated pattern is then positioned in a frame or box and highly-filled, tool grade epoxy resin cast thereabout and cured. The pattern is then removed, the exposed porous molding surface filled with electrically conductive epoxy resin, and electroplated as described above.

DETAILED DESCRIPTION OF SPECIFIC EMBODIMENTS OF THE INVENTION

In accordance with one example of the subject invention, a mass of zinc comprising about 10% to about 11% Cu, about 3% to about 4% Al, about 0.35% to about 0.55% Mg and the balance essentially Zn was cast in the form of a flat plate. The plate had a variety of micropores therein the maximum diameter of which was about 0.002 inch. The surface of the casting was finished, and in the course thereof, the micropores were exposed on the surface. A silver-filled, high temperature epoxy provided by Epoxy Technology Company of Billerica, Mass. and sold under the name of Epotek H20E was then brushed into the micropores. The epoxy was filled with about 95% by weight silver particles. Excess epoxy was removed by wiping the surface with a stiff rubber squeegee. The plate was then heated at 120° C. for 15 minutes to cure the epoxy. The epoxy-filled surface was then lightly abraded with a SCOTCHBRITE ® pad sold by the 3M Co. of Minneapolis, Minn. so as to remove any remaining excess epoxy. The plate was then cleaned and electroplated with successive layers of silver (i.e., ca 0.001 inch) from an electrolyte comprising silver Solution No. 3083 provided by SIFCO Industries, Inc. of Cleveland, Ohio.

The electrolyte was applied to the surface using a swab applicator having a pad on the end thereof saturated with the electrolyte fed thereto from the applicator. The silver coating served as both a surface leveler, and a diffusion barrier between a subsequently applied copper coating and the zinc substrate. A layer of copper (i.e., about 0.002 inch thick) was then electrodeposited atop the silver layer likewise using a swab applicator. Finally, a 0.002 inch thick layer of nickel electrodeposited (i.e., from SIFCO electrolyte Solution No. 2085) atop the copper using a swab applicator. The thusly coated plate was then heat cycled to test its long term stability. More specifically, the plate was heated to 82° C. for eight days during which time the plate was quenched to room temperature sixteen (16) different times. No change was noted in the surface after this thermal cycling regimen.

In another test, some zinc plates were prepared and coated as set forth in the previous example, and others were coated with only a single layer of nickel (i.e., 0.002 inch thick). Over a period of five days both sets of plates were cyclically heated for one hour to 150° C. and then cooled for one hour at room temperature. The surfaces of the plates coated only with nickel remained in excellent condition, while the surfaces of the plates made with the silver, copper, nickel coating displayed some minor blistering.

While the invention has been described primarily in terms of specific embodiments thereof, it is not intended to be limited thereto but rather only to the extent set forth hereafter in the claims which follow.

The embodiments of the invention in which an exclusive property or privilege is claimed as defined as follows:

1. A method of making a substantially cast-to-size mold for forming an as-molded class A finish on the external surface of a plastic article formed in said mold comprising the steps of:
   forming the material comprising said mold about a pattern conforming substantially to the finished dimensions of said article so as to provide a molding surface defining a molding cavity for shaping said article, said surface comprising a porous metal;
   filling pores in said porous metal with an electrically conductive thermosetting resin having a continuous use capability of at least about 175° C.;
   curing said thermosetting resin; and
   electrodepositing a smooth continuous metallic topcoat onto said surface which topcoat is impervious to the plastic being molded thereagainst.

2. The method according to claim 1 wherein said thermosetting resin comprises a metal-filled epoxy.

3. The method according to claim 2 wherein said porous metal comprises zinc and said topcoat is selected from the group consisting of nickel and chromium.

4. The method according to claim 3 including the steps of electrodepositing a continuous layer of silver atop said resin-filled surface and a continuous layer of copper atop said silver layer prior to depositing said topcoat.

5. The method according to claim 2 wherein the metal filling said epoxy comprises silver.

6. A method of making a substantially cast-to-size mold for forming an as-molded class A finish on the external surface of a plastic article formed in said mold comprising the steps of:
   casting said mold out of a zinc-aluminum-copper alloy so as to provide a surface defining a near-netshape molding cavity conforming substantially to the shape of said article;

finishing said surface size and, in the process thereof, exposing subsurface micropores in the casting to said surface;

filling said micropores with an electrically conductive thermosetting resin having a continuous use capability of at least about 175° C.;

curing said thermosetting resin;

electrodepositing a smooth continuous metallic topcoat onto said surface which topcoat is impervious to the plastic being molded thereagainst.

7. The method according to claim 6 wherein said thermosetting resin comprises a metal-filled epoxy.

8. The method according to claim 7 wherein said topcoat is selected from the group consisting of nickel and chromium.

9. The method according to claim 8 including the steps of electrodepositing a continuous layer of silver atop said resin-filled surface and a continuous layer of copper atop said silver layer prior to depositing said topcoat.

10. The method according to claim 7 wherein the metal filling for said epoxy comprises silver.

11. A method of making a substantially cast-to-size mold for forming an as-molded class A finish on the external surface of a plastic article formed in said mold comprising the steps of:

spraying a shell of porous metal onto a pattern conforming substantially to the finished dimensions of said article so as to provide a molding surface defining a molding cavity for shaping said article;

casting and curing epoxy resin about said porous metal shell;

removing said pattern to expose said molding surface and the pores therein;

filling said pores with an electrically conductive thermosetting resin having a continuous use capability of at least about 175° C.;

curing said thermosetting resin; and electrodepositing a smooth continuous metallic topcoat onto said surface which topcoat is impervious to the plastic being molded thereagainst.

12. The method according to claim 11 wherein said thermosetting resin comprises a metal-filled epoxy.

13. The method according to claim 12 wherein said topcoat is selected from the group consisting of nickel and chromium.

14. The method according to claim 12 wherein said porous metal is zinc, a continuous layer of silver is electrodeposited atop said resin-filled surface and a continuous layer of copper is electrodeposited atop said silver layer prior to depositing said topcoat.

15. The method according to claim 12 wherein the metal filling for said epoxy comprises silver.

* * * * *